United States Patent [19]

Babu

[11] Patent Number: 5,294,668
[45] Date of Patent: Mar. 15, 1994

[54] POLYOLEFIN PRESSURE-SENSITIVE ADHESIVE COMPOSITIONS CONTAINING MACROMONOMERS

[75] Inventor: Gaddam N. Babu, Woodbury, Minn.

[73] Assignee: Minnesota Mining and Manufacturing Company, St. Paul, Minn.

[21] Appl. No.: 614,251

[22] Filed: Nov. 15, 1990

[51] Int. Cl.$^5$ ............................................. C08L 51/06
[52] U.S. Cl. ..................................... 525/80; 525/101; 525/106; 525/474; 525/479
[58] Field of Search ................. 525/80, 101, 106, 474, 525/479

[56] References Cited

U.S. PATENT DOCUMENTS

| | | |
|---|---|---|
| Re. 24,906 | 12/1960 | Ulrich . |
| 3,542,717 | 11/1970 | Lipman ............................ 260/27 |
| 3,842,057 | 10/1974 | Milkovich et al. ............ 260/93.5 A |
| 3,842,058 | 10/1974 | Milkovich et al. ............ 260/93.5 A |
| 3,842,059 | 10/1974 | Milkovich et al. ............ 260/93.5 R |
| 3,842,146 | 10/1974 | Milkovich et al. ................ 260/879 |
| 3,862,267 | 6/1975 | Milkovich et al. ................ 525/314 |
| 3,954,697 | 5/1976 | McConnell et al. ............... 526/350 |
| 4,007,311 | 2/1977 | Harlan, Jr. ........................ 428/246 |
| 4,080,400 | 3/1978 | Martin ............................... 260/825 |
| 4,178,272 | 12/1979 | Meyer, Jr. et al. ................ 260/27 R |
| 4,551,388 | 11/1985 | Schlademan ...................... 428/355 |
| 4,554,324 | 11/1985 | Husman et al. ................... 525/301 |
| 4,656,213 | 4/1987 | Schlademan ....................... 525/64 |
| 4,693,935 | 9/1987 | Mazurek ............................ 428/352 |
| 4,879,193 | 11/1989 | Takaya et al. . |
| 4,994,322 | 2/1991 | Delgado et al. .................. 428/343 |

FOREIGN PATENT DOCUMENTS

0421643A2 of 0000 European Pat. Off. .
0244078 11/1987 European Pat. Off. .

OTHER PUBLICATIONS

Satas, D., "Handbook of Pressure-Sensitive Adhesive Technology," Van Norstrand Reinhold, N.Y., 1982, pp. 220–223.
Sperling, L. H., "Introduction to Physical Polymer Science," John Wiley & Sons, N.Y., 1986, pp. 111–116 and 279–280.
French Search Report, Application No. BE 9100009.

*Primary Examiner*—John C. Bleutge
*Assistant Examiner*—D. Aylward
*Attorney, Agent, or Firm*—Gary L. Griswold; Walter N. Kirn; Lorraine R. Sherman

[57] ABSTRACT

The invention provides pressure-sensitive adhesive (PSA) compositions comprising a graft copolymer of one or more of ethylene and $C_3$–$C_{18}$ α-olefins and one or more of a new class of macromonomers. The adhesive composition comprises a blend of the graft copolymer with a tackifying resin. Sheet materials can be coated with layers of the adhesive composition to provide tapes and laminates.

17 Claims, No Drawings

POLYOLEFIN PRESSURE-SENSITIVE ADHESIVE COMPOSITIONS CONTAINING MACROMONOMERS

TECHNICAL FIELD

This invention relates to pressure sensitive adhesive compositions comprising a copolymer with a saturated hydrocarbon backbone having one or more grafted pendant moieties preferably derived from polymerizable ethenylarene and conjugated diene monomers and to sheet materials coated therewith.

BACKGROUND OF THE INVENTION

A continuing need in the pressure sensitive adhesive (PSA) art is achievement of a better control over various mechanical and process properties so that adhesives can be "tailor-made" for specific, highly demanding end-use applications such as packaging, medical, and masking tapes. These applications require a proper balance of PSA properties, which varies with each of the different end-uses.

Pressure sensitive adhesive compositions suitable, for example, for use in adhesive tape must have a requisite fourfold balance of adhesion, cohesion, stretchiness and elasticity as disclosed by U.S. Pat. No. Re. 24,906. The desire to maintain this balance of properties makes it extremely difficult to improve internal strength i.e., cohesiveness without sacrificing other desirable properties and destroying the overall pressure-sensitive nature of the adhesive system.

Among the earliest polymers to provide a reasonable balance of the properties required for satisfactory PSA performance were the natural and synthetic rubbers. However, these PSAs had poor cohesive strength, especially at elevated temperatures and poor aging properties, e.g. they oxidized easily.

Phase-separating/segregating (PS) block copolymers, like the styrene-butadiene-styrene KRATON ™ rubbers, can be used to improve the cohesive strength and hot-melt processability of PSAs. However this class of PSAs still has poor aging properties. The PS block copolymers contain end-blocks which are capable of forming phase-separated/segregated "glassy" domains that act as thermally reversible crosslinks providing cohesive strength when such block copolymers are used in pressure-sensitive adhesives. At high temperatures the glassy domains effectively "dissolve" in the rubbery phase. When the polymer is cooled, the domains reform allowing recovery of the original physical and chemical properties. The reinforcing nature of phase-separation in polymers is described in more detail by D. Satas, "Handbook of Pressure-Sensitive Adhesive Technology", Van Norstrand Reinhold, NY, 1982, pp.220-223 and L. H. Sperling, "Introduction to Physical Polymer Science", John Wiley & Sons, NY, 1986, pp. 111-116 and pp. 279-280 which is hereby incorporated for reference.

With the advent of Ziegler-Natta (ZN) catalysts, the polymerization of α-olefins to polymers, some of which are naturally tacky and have PSA properties, became possible. However, unmodified α-olefin polymer PSAs generally have poor internal strength.

U.S. Pat. No. 3,542,717 describes laminating adhesives made from tackified mixtures of ZN copolymers derived from α-olefin monomers of from 4 to 20 carbon atoms. When tackified, the copolymer mixture has PSA properties, while certain other compositions functioned as hot-melt adhesives, see column 4, lines 22-34. While the cohesive strength of the adhesive was acceptable for its intended laminating applications, nothing is mentioned about shear strength at elevated temperature.

U.S. Pat. No. 3,954,697 discloses that PSAs provided by copolymers of polypropylene and $C_6$ to $C_{10}$ α-olefins can have good cohesive strength when hot-melt coated at a melt temperature of at least 350° F. (177° C.), a temperature at which the copolymers exhibit no detectable crystallinity when examined using X-ray or DSC techniques.

U.S. Pat. No. 4,178,272 discloses that a hot-melt adhesive that provides strong T-peel and lap shear bonds can be made using α-olefin polymers. The hot-melt adhesive is a blend of poly(propylene-co-higher 1-olefin), tackifying resin, and crystalline polypropylene. The blend is not said to be naturally tacky or a PSA. In Example 1, adhesive bonds are formed at 200° C.

The development of techniques of graft copolymerization, i.e. the attachment of high molecular weight pendant side chains to the polymer backbone, permitted modification of polymer properties. Most of this prior art does not deal with PSA systems.

U.S. Pat. No. 4,007,311 shows that grafting methyl methacrylate to a styrene-isoprene-styrene block copolymer enhances adhesion without regard for elasticity or cohesiveness.

U.S. Pat. Nos. 4,554,324, 4,551,388 and 4,656,213 describe copolymers having macromonomers grafted to an acrylate polymer backbone by free-radical polymerization to improve the shear adhesion of pressure-sensitive adhesives and sheet materials coated therewith.

U.S. Pat. No. 3,862,267 teaches how to make and use a number of vinyl terminated polystyrene macromonomers in copolymerization processes with other ethylenically unsaturated monomers. Initiation of these copolymerizations is described as: addition, anionic, cationic, condensation, and coordination.

SUMMARY OF THE INVENTION

Briefly, the present invention provides compositions that are PSAs at about 20° C. to 30° C. or become PSAs at higher temperatures comprising:
a) 40 to 99% by weight of a ZN graft copolymer comprising:
  1) 0.1 to 25%, preferably 0.1 to 10% by weight of a macromonomer comprising the polymerized product of at least one of an ethenylarene and a conjugated diene monomer and having a terminal ω-alkenyl group of at least 4 carbon atoms and;
  2) 99.9 to 75%, preferably 99.9 to 90% by weight of an alpha-olefin having 2 to 18 carbon atoms of which 60 to 100% of the total α-olefins are α-olefins having 6 to 14 carbon atoms; and
b) 60 to 1% by weight of one or more compatible tackifying resins.

In another aspect, the invention provides sheet materials coated with the PSA composition. Such sheet materials comprise a backing member and the PSA coating composition of the invention covering at least a portion of one major surface thereof.

In still other aspects, the invention provides articles comprising the coated sheet material in the configuration of a roll of tape comprising a flexible backing sheet having at least one major surface coated with the PSA of the invention. Another article of the invention is a transfer tape comprising a film of PSA composition of the invention between two release liners.

In this application, the terminology and nomenclature relating to the macromonomers and graft copolymers of the invention is that used by L. H. Sperling, "Introduction to Physical Polymer Science", John Wiley, NY, 1986, pp. 39–47, pp. 111–116, and pp. 279–280 which are hereby incorporated for reference, "living polymer" means a polymer prepared by anionic polymerization that has no effective termination reactions (Courie, "Polymers: Chemistry and Physics of Modern Materials", Intex Ed. Pub., NY, 1973, p. 82-3);

"macromonomer" means a polymer having a number average molecular weight ranging from several hundred to tens of thousands, with a functional group $-CH_2-CH_2-CH=CH_2$;

"at least one of an ethenylenearene and conjugated diene polymer" means a polymer prepared by anionic polymerization that contains either or both of ethenylarene and conjugated diene units;

"Ziegler-Natta (ZN) catalyst" means a two-component coordination initiator or catalyst having the properties described by Seymour and Carraher, "Polymer Chemistry", Marcel Dekker, Inc., NY (1988), p. 296, and, "linear omega-alkenyl group" means a group having the formula $-C_nH_{2n}-CH_2-CH_2-CH=CH_2$ where n is 0 to 16;

"alpha ($\alpha$)olefin" means any vinyl-containing aliphatic monomer, and in this application includes ethylene;

"number-average molecular weight ($\overline{M}_n$), weight average molecular weight ($\overline{M}_w$) and Z-average molecular weight ($\overline{M}_z$)" are well known mathematical descriptions of the molecular weight distribution of a polymer sample;

"polydispersity (pp)" is a measure of the molecular weight distribution of a polymer and is defined as $\overline{M}_w/\overline{M}_n$. Further explanation of the derivation of these terms may be found in Experimental Methods in Polymer Chemistry, Wiley and Sons, 1981, Chapter 3 entitled "Molecular Weight Averages", pages 57–61.

The adhesives of the present invention impart improved shear strength without crosslinking.

There is no prior art of which we are aware that discloses the use of chemically tailored, inherently tacky, macromonomer grafted, poly($\alpha$-olefin) copolymers to make PSA compositions which possess improved shear strength.

Assignee's copending patent application, filed the same date as this application, now U.S. Pat. No. 5,104,952, and its division U.S. Ser. No. 07/775,684, filed Oct. 10, 1992, discloses macromolecular monomers and graft copolymers thereof which are useful in the present invention compositions.

DETAILED DESCRIPTION OF THE PREFERRED EMBODIMENTS OF THE INVENTION

The graft copolymer of the invention is preferably phase-separating into rubbery and glassy domains that provide a PSA having a shear strength of at least 30 minutes, preferably from 75 to 10,000 minutes. It is further preferred that: 1) the rubber regions of the phase separated copolymer have a $T_g$ in the range of from $-70°$ C. to $-10°$ C., 2) the glassy macromonomer rich domains have a $T_g$ in the range of from $20°$ C. to $300°$ C., and 3) the macromonomer has a number average molecular weight in the range of from 2,000 to 30,000. Peel adhesions of the PSA composition can be adjusted to pre-selected values by adding tackifying resins to the composition. The neat or tackified phase separating PSA compositions have excellent peel strength, shear strength, tack, creep resistance, and processability. Furthermore, the adhesives have excellent thermal and thermo-oxidative stability because there are no residual ethylenically-unsaturated groups in the polymer backbone.

The phase separated domains of high $T_g$ glassy macromonomer act as physical/reversible crosslinks interconnecting adjacent low $T_g$ inherently tacky $\alpha$-olefin regions. This dramatically increases the cohesive strength of the adhesive and makes possible the formulation of high shear strength adhesives. The PSAs of the invention can be normally tacky at $20°$–$30°$ C. or they can become tacky upon application of heat.

Specifically, the graft copolymers of use in the tacky PSA compositions of the invention are copolymers of (1) macromonomer comprising an ethenylareneconjugated diene polymer having a terminal omega-alkenyl group of at least 4 carbon atoms and (2) one or more alpha-olefin having 2 to 18 carbon atoms, preferably having the following formulae:

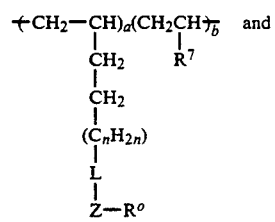 I

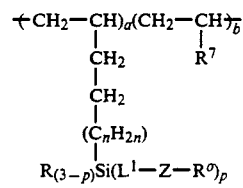 II wherein:

L is a covalent bond or a divalent linking group selected from the group consisting of

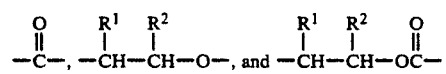

groups, in which each of $R^1$ and $R^2$ is independently hydrogen, an alkyl group having 1 to 4 carbon atoms, phenyl, or both of $R^1$ and $R^2$ together with the carbon atoms to which they are attached form a ring having 5 or 6 carbon atoms; and most preferably, L is a convalent bond or a

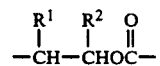

group;

$L^1$ is a covalent bond or a divalent linking group

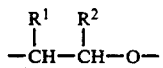

in which $R^1$ and $R^2$ are defined above;

$R^0$ is a saturated or unsaturated linear hydrocarbyl group having 2 to 20 carbon atoms, a branched hydrocarbyl group having 3 to 20 carbon atoms or cyclic hydrocarbyl group having 5 to 20 carbon atoms;

$R^7$ is hydrogen or one or more alkyl groups having 1 to 16 carbon atoms, at least 60% of $R^7$ being an alkyl group having 4 to 12 carbon atoms;

n is an integer having a value from 0 to 16 preferably from 0 to 4;

p is an integer having a value of 1, 2, or 3, each R is independently a monovalent hydrocarbyl group which is selected from alkyl groups having from 1 to 18 carbon atoms, aryl groups having from 6 to 10 carbon atoms, and cyclic hydrocarbyl groups having from 5 to 10 carbon atoms, preferably, R is methyl or ethyl; and Z is a divalent polymeric group having either or both of polymerized ethenylarene and conjugated diene repeat units and preferably a number average molecular weight of from about 2,000 to about 30,000; and a and b are numbers providing a number average molecular weight of 50,000 to 10,000,000 to the graft copolymer, a having a value that is 0.1 to 25% of (a+b), preferably 0.1 to 10% of (a+b) of one or both of 1).

More particularly, Z is a divalent polymeric group obtained by the anionic polymerization of one or more of 1) at least one ethenylarene monomer having 8 to 20 carbon atoms, and 2) at least one conjugated diene monomer having 4 to 20 carbon atoms.

The divalent polymeric group Z can be a homopolymeric group comprised solely of ethenylarene monomers, or solely of conjugated diene monomers. The polymer can also be a copolymer comprising both ethenylarene and conjugated diene monomers. The copolymer can be a random copolymer, a block copolymer, or a tapered block copolymer. When Z is a block polymeric group, it may be di-block or higher. More preferably, Z has a number average molecular weight in the range of 2,000 to 30,000 and a polydispersity in the range of 1.05 to 5.0, preferably in the range of 1.05 to 3.0.

In preferred embodiments, the divalent polymeric Z group has the general formula:

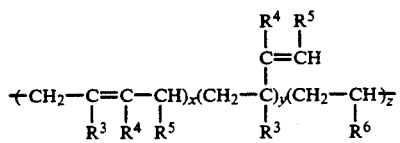

wherein each $R^3$, $R^4$ and $R^5$ is independently, hydrogen, a phenyl group, an alkyl group or alkenyl group having 1 to 12 carbon atoms [there being no more than 16 carbon atoms total in $(R^3+R^4)$], or any two of $R^3$, $R^4$ and $R^5$ together with the carbon atoms to which they are attached form one or two saturated or unsaturated 5 or 6 carbon atom rings, preferably each of $R^3$, $R^4$ and $R^5$ is hydrogen or methyl;

$R^6$ is an aryl group having 6 to 18 carbon atoms, optionally substituted by lower alkyl groups having from 1 to 4 carbon atoms, trialkylsilyl, 2,2-dialkylalkoxysilyl, N,N-bis(trimethylsilyl)amino, trimethylsiloxyethyl groups; and 1,1-dimethylethoxycarbonyl; and x, y, and z are numbers providing a number average molecular weight of 2,000 to 30,000 to the polymeric Z group and expressing the number of ethenylarene and conjugated diene groups that are present in random or block configuration in the polymeric Z group, in which numbers any of x, y, and z can be zero, but at least one of x, y, and z is not zero.

The macromonomers are prepared by either of methods I and II.

By method Ia, the macromonomer is made by anionically polymerizing ethenylarene and/or conjugated diene monomers to form a living polymer, the Z group anion, and terminating the living anion with a terminating agent having multiple functionality, e.g. an omega-alkenyl group and one or more group(s) capable of undergoing nucleophilic displacement reactions. Useful terminating agents include omega-alkenyl acid halides and omega-alkenyl halides which react to form macromonomers containing carbonyl or covalent bond linkages (as shown in Summary Reactions I below).

By method Ib, omega-alkenyl mono-, di-, and tri-, halosilanes whose highly reactive silicon-halogen bond allows controlled preparation of linear, branched, and star macromonomers having narrow molecular weight distributions are used as terminating agents in the preparation of the macromonomer (as shown in Summary Reactions II below).

By method II, the macromonomer is prepared directly by reacting an initiator containing omega-alkenyl groups with anionically polymerizable ethenylarene and/or conjugated diene based monomers to form a living polymer and terminating the living anion by reaction with alcohol as is well known in the art. The polymerization and termination reactions are summarized in Summary Reactions III, below. The macromonomers of use in the adhesive compositions of the invention have a glass transition temperature in the range of $-70°$ to above $100°$ C.

Summary Reactions I

Method Ia

Termination Type A

-continued

Summary Reactions I
Method Ia

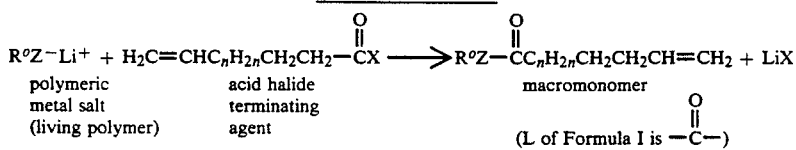

Termination Type B

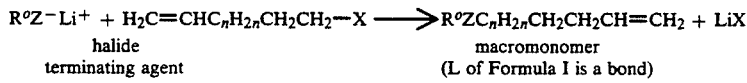

Termination Type C

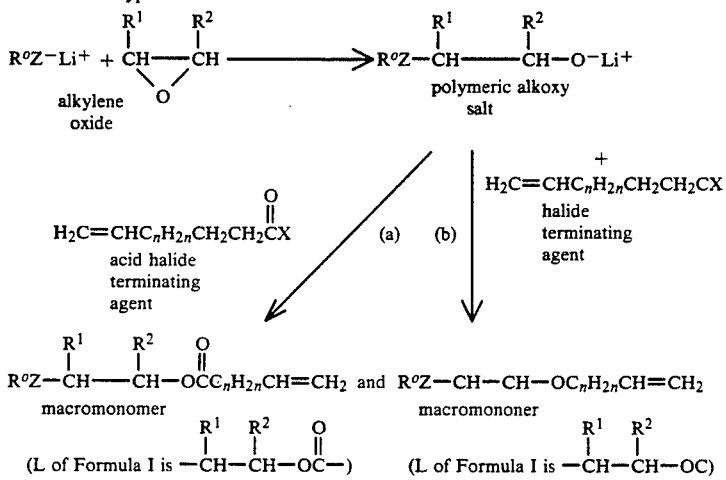

wherein $R^o$, $Z$, $R^1$, $R^2$, n and X are as previously defined.

Summary Reactions II
Method Ib

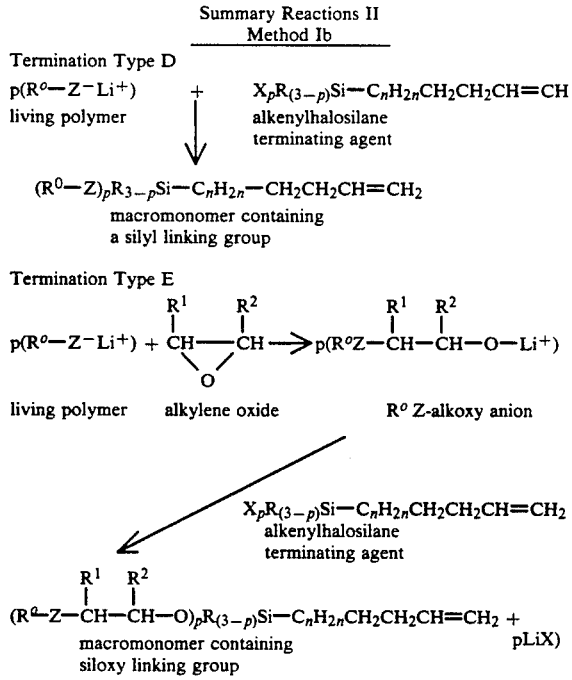

Termination Type D p($R^o$—$Z^-$$Li^+$) + $X_pR_{(3-p)}$Si—$C_nH_{2n}$CH$_2$CH$_2$CH=CH
living polymer    alkenylhalosilane
                  terminating agent ($R^O$—Z)$_p$R$_{3-p}$Si—$C_nH_{2n}$—CH$_2$CH$_2$CH=CH$_2$
macromonomer containing
a silyl linking group Termination Type E wherein $R^o$, R, Z, p, n, $R^1$, $R^2$, and X are as previously defined.

Summary Reactions III
Method II

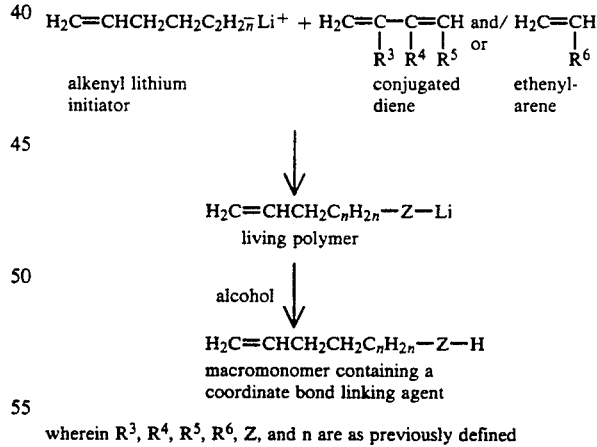

wherein $R^3$, $R^4$, $R^5$, $R^6$, Z, and n are as previously defined

If a less reactive anion is desired in either of Methods Ia or Ib, the living polymer anion can be converted to an alkoxy anion by the addition of ethylene oxide or substituted ethylene oxide prior to reaction with the terminating agent (Termination Types C(a), C(b), and E).

The anionic polymerization methods used to make the Z group anion are well known to those skilled in the polymer art. Such methods are discussed by Seymour and Carraher, supra, p. 291–296. For example, the Z groups can be conveniently prepared by reacting at least one of ethenylarene and conjugated diene monomers with an alkali metal hydrocarbon or alkoxide salt in the presence of an inert hydrocarbon or ether organic solvent that does not participate in, or interfere with, the polymerization process. Anionic polymerization methods are also described by Milkovich et al., (U.S. Pat. Nos. 3,786,116 and 3,842,059), the disclosures of which are incorporated herein by reference.

The divalent polymeric group, Z, can be a homopolymeric group made from only ethenylarene monomers, or only from conjugated diene monomer. It also can be random or block polymeric group formed from both ethenylarene and conjugated diene monomers. When Z is a block polymeric group it may be di-block or higher.

Preferably, the macromonomer has a number average molecular weight in the range of 2,000 to 30,000. Although U.S. Pat. No. 3,786,116 teaches that the molecular weight distribution of the polymer chains of a macromonomer should be narrow, i.e., a polydispersity of less than 1.1 for preparation of polymer having improved physical characteristics useful as tough, flexible self-supporting films, it has been found that useful PSA compositions according to the present invention can be made with macromonomer having a polydispersity of up to about 5 without deleterious effects on adhesive properties. The polydispersity of the macromonomer of the invention preferably can be from about 1.05 to 5.0, preferably 1.05 to 3.0.

Any ethenylarene having 8 to about 20 carbon atoms that can be polymerized by anionic polymerization methods can be used in the preparation of the divalent Z group. Examples include: styrene(ethenyl benzene), α-methylstyrene (propenylbenzene), 1-ethenyl-2-methylbenzene, 1-ethenyl-3-methylbenzene, 1-ethenyl-4-methylbenzene, 1-ethenyl-4-(1,1-dimethylethyl)benzene, 4-dodecyl-1-ethenylbenzene, 1-ethenylnaphthalene, 2-ethenylanthracene, 10-ethenylanthracene, 1-ethenylfluorene, 2-ethenylphenanthrene, 1-ethenylpyrene, and the like. Examples of ethenylarenes substituted by groups that provide elevated glass temperatures to the macromonomers of use in the invention and are unreactive under anionic polymerization conditions are: 1-ethenyl-4-methylbenzene, 1-ethenyl-4-ethylbenzene, 1-ethenyl-4-t-butylbenzene, 1-ethenyl-4-(trimethylsilyl)benzene, 1-ethenyl-4-(dimethyl-1-methylethoxysilyl)benzene, 1-ethenyl-4-[N,N-bis(trimethylsilyl)amino]benzene, 1-ethenyl-4 [1,1-dimethyl)ethoxycarbonyl]benzene, and the like.

Any conjugated diene having 4 to about 20 carbon atoms capable of polymerization by anionic methods can be used in the preparation of the monovalent polymeric Z group. Examples of linear and branched conjugated dienes include: 1,3-butadiene 1,3-pentadiene, 1,3-hexadiene, 1,3-heptadiene, 2-methyl-1,3-butadiene (isoprene), 2,3-dimethyl-1,3-butadiene, 2,3-diethyl-1,3-butadiene, 2,5-dimethyl-1,3-hexadiene, 2-phenyl-1,3-butadiene, 2,3-diphenyl-1,3-butadiene, 2-methyl-6-methylene-2,7-octadiene (myrcene), and the like. Examples of cyclic conjugated dienes include: 1,2-bis(methylene)cyclopentane, 1,2-bis(methylene)cyclohexane, 3-methylenecyclohexene, 1-ethenylcyclohexene, 1-ethenylcyclopentene, 2,3-bis(methylene)bicyclo[2.2.1]heptane, and the like.

Initiators for anionic polymerization may be any of the alkali metal hydrocarbyl salts which produce a monofunctional living polymer, i.e., only one end of the polymer contains a reactive ion. Such initiators include organometallic hydrocarbon salts of lithium, sodium, or potassium, for example, having an alkyl or alkenyl radical containing up to 20 carbon atoms or more, and preferably up to 8 carbon atoms. Illustrative alkali metal organometallic initiators include ethylsodium, propylsodium, phenylsodium, ethyllithium, propyllithium, n-butyllithium, i-butyllithium, tert-butyllithium, 3-butenyllithium, 4-pentenyllithium, 5-hexenyllithium and 7-octenyllithium. The preferred initiators are n-butyllithium, sec-butyllithium, and 3-butenyllithium.

Terminating agents for use in Method I, Terminating Types A, B and C may be chosen from ω-alkenyl halides containing 4 to 18 carbon atoms, preferably 4 to 10 carbon atoms, there being at least two carbon atoms between the halogen and the omega double bond and ω-alkenoyl halides containing 5 to 18 carbon atoms, preferably 5 to 10 carbon atoms, there being at least 2 carbon atoms between the carbonyl group and the omega double bond. Illustrative alkenoyl chlorides include 5-hexenoyl chloride, 6-heptenoyl chloride, 7-octenoyl chloride, 9-decenoyl chloride, 10-undecenoyl chloride, 13-tetradecenoyl chloride, and 17-octadecenoyl chloride. The more preferred alkenoyl chlorides are 5-hexenoyl chloride and 10-undecenoyl chloride. Illustrative alkenyl halides include 3-butenyl chloride, 4-pentenyl chloride, 5-hexenyl chloride, 6-heptenyl chloride, 7-octenyl chloride, 9-decenyl chloride, 10-undecenyl chloride, and 17-octadecyl chloride. Preferred alkenyl halides are 3-butenyl chloride and 5-hexenyl chloride.

Terminating agents for use in Method I, Termination Types D and E may be chosen from omega-alkenylhalosilanes containing up to 18 methylene groups, preferrably 4 or more methylene groups, which are commercially available (see *) or can be made using the methods disclosed in the Examples (infra). Illustrative ω-alkenylhalosilanes include, for example:
3-butenyldimethylchlorosilane
5-hexenyldimethylchlorosilane*
7-octenyldimethylchlorosilane*
2-methyl-5-hexenyldimethylchlorosilane
17-octadecenyldimethylchlorosilane
5-hexenylmethylphenylbromosilane
5-hexenyldiphenylchlorosilane
3-butenylmethydichlorosilane
7-octenylmethyldibromosilane
5-hexenyltrichlorosilane*
7-octenyltrichlorosilane*

*These alkenylchlorosilanes are available from Petrarch Systems, Bristol, Pa. 19007.

Since every Method II initiator molecule contains an alkenyl group, every resulting living polymer anion contains an alkenyl group; therefore, unlike Method I macromonomers, the efficiency and yield of the termination reaction by Method II does not affect the conversion of living polymer to macromonomer.

Graft copolymerization of the α-olefin and the macromonomer according to the present invention are conducted using a ZN coordination catalyst. Such ZN coordination catalyst systems are described by Seymour and Carraher, Supra. The preferred 2-component catalyst systems are dialkyl aluminum chloride/titanium trichloride or dialkyl aluminum sesquichloride/vanadium oxytrichloride. Reaction takes place in the presence of inert solvents in the temperature range of about −100° C. to abut +100° C. Suitable nonpolar organic reaction solvents include heptane, toluene, hexane, cyclohexane, pentane, and the like. The amount of solvent is generally about 10 to 30% by weight based on the total weight of the reactants and solvent.

Furthermore, about 1.5 to 8 moles excess Lewis acid such as $(C_2H_5)_3Al$, $AlCl_3$, $SnCl_4$, or $BCl_3$, can be used with macromonomers containing carbonyl linking groups to shield the carbonyl group from interaction with the ZN catalyst during the graft copolymerization process.

As described above, the preferred graft copolymer is prepared by copolymerization of α-olefin and reinforcing (see Summary Reactions I, Method Ia, type C(a), above) macromonomer. The graft copolymer, however, can be prepared by techniques which provide a degree of predictability of the properties of the end products. These and other polymer grafting techniques are described by Noshay and McGrath in Block Copolymers, Academic Press, New York (1977), pages 13-16.

A substantial increase in shear strength results when macromonomer is copolymerized with α-olefin. The amount of macromonomer in the copolymer determines the shear properties of the copolymer. With increasing amounts of macromonomer the resultant copolymer becomes increasing less tacky. However, these materials are useful as hot-tackifying, heat activated, or semi structural adhesives.

The α-olefins of the ZN graft copolymer of the PSA composition have the following formula:

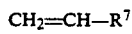

$$CH_2=CH-R^7$$

wherein $R^7$ is as previously defined.

Preferred α-olefin comonomers include, but are not limited to, linear $C_6$ to $C_{14}$ α-olefins such as 1-hexene, 1-octene, 1-decene, 1-dodecene, 1-tetradecene and the like; and branched α-olefins such as 2-methylbutene, 3-methylhexene, 8-methyldecene, 10-methyldodecene, and the like. Alpha-olefins such as ethylene, propylene, 1-butylene, isobutylene, and 1-pentylene can be used.

In addition to the macromonomer-containing α-olefin polymers, the PSA composition of the invention contains a tackifying resin which imparts tack, lower viscosity, improved coatability, good heat stability, and improved peel adhesion. Compatible tackifying resin can be prepared by polymerization of monomers consisting primarily of olefins and diolefins and include, for example, residual by-product monomers of the isoprene manufacturing process. These hydrocarbon tackifying resins typically exhibit Ball and Ring softening points of from about 80° C. to about 145° C.; acid numbers from about 0 to 2, and saponification values of less than one. Examples of such commercially available tackifying resins based on a $C_5$ olefin fraction of this type are "Wingtack" 95 and "Wingtack" 115 tackifying resins available from Goodyear Tire and Rubber Co. Other useful hydrocarbon tackifying resins include "Regalrez" 1078 and "Regalrez" 1126 tackifying resins available from Hercules Chemical Co., Inc. Wilmington, Del.; Arkon TM resins, such as Arkon TM P115, available from Arakawa Forest Chemical Industries, Chicago, Ill.; and Escorez TM resins available from Exxon Chemical Co.

Other suitable tackifying resins include the terpene polymers, such as polymeric resinous materials obtained by polymerization and/or copolymerization of terpene hydrocarbons such as alicyclic, mono and bicyclic monoterpenes and their mixtures including carene, isomerized pinene, terpentene, and various other terpenes. Commercially available resins of the terpene type include the Zonarez TM terpene B-series and 7000 series available from Arizona Chemical Corp., Wayne, N.J. 07470. Typical properties reported for the Zonarez TM terpene resins include ball and ring softening points of about 55° C. to 125° C. (ASTM E28-67), Acid Numbers of less than one (ASTM D465-59), and Saponification Numbers of less than one (ASTM D464-59). The terpene resin used in Examples below is a poly(beta-pinene) resin, Piccolyte TM S115 resin, available from Hercules Chemical Co., Inc., which has a Ball and Ring Softening Point of 115° C., an Acid Number of one, and Iodine Number of 190.

The tackifying resins may contain ethylenic unsaturation; however, saturated tackifying resins are preferred for those applications where oxidation resistance is important. The total amount of tackifying resins in the composition is 1 to 150 parts, more preferably 5 to 50 parts, and most preferably 15 to 35 parts by weight per 100 parts of polymer. Incompatible tackifiers such as those based on rosin esters are not useful in the practice of the invention since they produce hazy blends. Furthermore, the presence of the incompatible tackifier results in a loss of tack.

Minor amounts of additives can also be included in the composition to provide adhesives for special end uses. Such additives may include pigments, dyes, plasticizers, fillers, stabilizers, ultraviolet absorbers, anti-oxidants, and the like. Plasticizers which can be employed include the well-known extender oils (aromatic, paraffinic, or napthanic) as well as wide variety of liquid polymers. Amount of additives used can vary from 0.1 to 50 weight percent depending on the end use desired.

The adhesive composition of the present invention can be coated onto a wide range of substrate materials, some examples being polymer films such as polyethylene terephthalate [PET], and biaxially oriented polypropylene [BOPP]; woven and non-woven fabrics; metals including metal foils such as aluminum, copper, lead, gold and the like; paper; glass; ceramics; and composite materials comprised of laminates of one or more of these materials.

The present invention copolymers are useful to prepare PSA tapes and coated articles. Coating can be accomplished by methods known in the art on the desired substrates (representative substrates are mentioned above). Coatings having thicknesses in the range of 5 to 250 micrometers can be useful. When flexible substrates are used, the resulting tapes can be wound into rolls. For PSA tapes and transfer tapes it may be desirable to use primer and low adhesion backsize layers, or to interpose one or more release liners in the roll. Sheet stock such as labels and decals can also include at least one of a primer layer, a low adhesion backsize layer, and a release liner.

TEST METHODS

The test methods used to evaluate the PSA coated flexible sheet materials are industry standard tests. The standard tests are described in detail in various publications of the American Society for Testing and Materials (ASTM). Philadelphia, Pa. and the Pressure Sensitive Council (PSTC), Glenview, Ill. The standard test methods are described in detail below. The reference source of each of the standard test methods is also given.

SHEAR STRENGTH (REFERENCE: ASTM D3654-78; PSTC-7)

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in units of time (minutes) required to pull a standard area of PSA coated sheet material from a stainless steel test panel under stress of a constant, standard load.

The tests are conducted on adhesive coated strips applied to a stainless steel panel such that a 12.7 mm by 12.7 mm portion of each strip is in firm contact with the panel with one end portion of the tape being free. The panel with coated strip attached is held in a rack such that the exposed face of the backing of the strip forms an angle of 182° at the edge of the panel when a mass of one kilogram is applied as a hanging weight from the free end of the coated strip. The 2° greater than 180° is used to negate any peel forces, thus ensuring that only the shear forces are measured, to determine the holding power of the tape being tested. The time elapsed for each tape example to separate from the test panel is recorded as the shear strength.

The time at which the mass falls at room temperature is called "RT Shear" (average of two specimens). When reported as "1000+", the tape had not failed after 1000 minutes. When the RT Shear is below about 30 minutes, the adhesive of the tape has generally failed by "pop off".

PEEL ADHESION (REFERENCE: ASTM D-3330-78 PSTC-1 (11/75)

Peel adhesion is the force required to remove a coated flexible sheet material from a test panel measured at a specific angle and rate of removal. In the examples, this force is expressed in Newtons per 100 mm (N/100 mm) width of coated sheet. The procedure followed is:

1. A test specimen 12.7 mm wide is applied to a horizontally positioned clean glass test plate. A 2.2 kg rubber roller is used to press a 12.7 cm length of specimen into firm contact with the glass surface.
2. The free end of the coated strip is doubled back nearly touching itself so that the angle of removal will be 180. The free end is attached to the adhesion tester scale.
3. The glass test plate is clamped in the jaws of a tensile testing machine which is capable of moving the plate away from the scale at a constant rate of 2.3 meters per minute.
4. The scale reading in Newtons is recorded as the tape is peeled from the glass surface. The data is reported as the range of numbers observed during the test.

Compatibilities of various base polymers with the tackifying resins and the plasticizers are determined by melting the samples of each blend between glass plates and observing the clarity of blends.

MOLECULAR WEIGHT

Number average molecular weight of the macromonomer is determined by the initiator/monomer ratio and the amount of initiator may vary from about 0.001 to about 0.1 per mole of monomer, or higher. Preferably, the concentration of the initiator will be from about 0.002 to about 0.04 mole initiator per mole of monomer. The smaller the initiator/monomer ratio the higher the number average molecular weight.

INHERENT VISCOSITY MEASUREMENT

In order to understand the benefits derived from the teachings of this invention, it is necessary to relate the improvements in shear strength and processability to the molecular weight of the adhesive and of the polymeric monomer which is incorporated into the adhesive. It is the comparative values which are significant and absolute figures are not required.

The inherent viscosity is measured by conventional means using a Cannon-Fenske #50 viscometer in a water bath controlled at 25° C. to measure the flow time of 10 ml of a polymer solution (0.2 g of polymer per deciliter in hexane). The Examples and Comparative Examples were run under identical conditions.

GEL PERMEATION CHROMATOGRAPHY

The characterization of the molecular weight distribution of the polymeric monomers was carried out by conventional gel permeation chromatography (GPC).

A Hewlett-Packard Model 1084B high performance liquid chromatograph equipped with six ultra STYRAGEL R TM columns of sized $10^6$A, $10^5$A, $10^4$A, $10^3$A, 500A and 100A was used for all determinations. Samples were dissolved in toluene and filtered through a 0.5 micrometer polytetrafluoroethylene filter. Samples were injected at volumes of 170 $\mu$l to 200 $\mu$l and eluted at a rate of 1 ml per minute through the columns maintained at 40° C.

Toluene was used as a solvent. The differential refractometer detector was a Hewlett-Packard Model 79877A. The system was calibrated using polystyrene standards and employing the least squares fit. All GPC calculations were performed on a Hewlett Packard Model 3388 integrator and all molecular weights averages are polystyrene equivalent molecular weights. The molecular weight averages and polydispersities were calculated according to standard procedures. GPC test methods are further explained in "Modern Size Exclusion Liquid Chromatography" Practical Gel Permeation Chromatography, John Wiley and Sons, 1979.

EXAMPLES

The following detailed description includes examples of preparation of macromonomers, ZN graft copolymerization with $C_6$ to $C_{10}$ $\alpha$-olefins to form graft copolymers, and formulation of pressure sensitive adhesive compositions made by blending the graft copolymers with tackifying resins. All parts in the examples are by weight unless otherwise specified.

PREPARATION OF MACROMONOMERS

Method Ia, Termination Type C(a)

Macromonomer having a carbonyl linking group and a polystyrene homopolymeric Z group A 10-undecenoyl-terminated polystyrene polymeric monomer having an average molecular weight of about 10,000 was prepared. A 1-liter, four-necked flask, fitted with a thermometer, mechanical stirrer, septum, Dean-Stark trap and condenser was charged with 500 g reagent grade toluene and heated therein to reflux under a slow argon stream. A portion (150 g) of the toluene was removed through the trap to eliminate water from the system, leaving 350 g (approximately 400 mL) of toluene.

Styrene monomer was first purified by passing over 200 mesh silica gel under argon and then 30 g (288 mmole) of this styrene monomer was introduced into the reaction flask by syringe through the septum to produce 8% by weight of the solution of styrene monomer in toluene. The solution was maintained at 60° C. About 5 to 10 drops of a 1.4M solution of n-butyllithium in hexane was added dropwise to the monomer solution until a faint yellow color persisted, indicating completion of the reaction with the impurities. Then 2.2 mL of the solution was added rapidly, causing an exothermic reaction. The flask contents were maintained at 60° C.

The rate of consumption of the monomer was followed by gas chromatography. The reaction was essentially completed in 1 hour. The reaction was run an additional 2 hours to ensure the complete conversion of the monomer to the polymer. The contents were cooled to 35° C. Ethylene oxide gas was introduced over the reaction mixture and the solution was rapidly agitated for 15 minutes until the orange color the polystyryllithium had completely disappeared. The reaction was then quenched with 2.5 grams of 10-undecenoyl chloride. The reaction mixture was stirred for an additional 2 hours at room temperature. The resultant polymer solution was then reduced in volume to approximately one-third and added dropwise to a large excess of isopropanol. The precipitated polymer was collected on a large sintered funnel, dried overnight under ambient conditions, further dried at 65° C. for 24 hours in a forced air oven and finally completely dried in vacuo. It was designated MAC-3b. Gel permeation chromatography revealed a number average molecular weight ($\overline{M}_n$) of 10,050, a weight average molecular weight ($\overline{M}_w$) of 13,270. Its polydispersity was 1.32. Analysis confirmed that the formula was essentially:

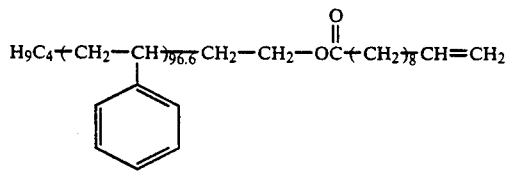

Method Ib, Termination Type D

Macromonomer having a polystyrene homopolymeric Z group and a silyl linking group A 5-hexenyldimethylsilyl-terminated polystyrene polymeric monomer having an average molecular weight of about 10,000 was prepared. An oven dried 500 mL two necked flask equipped with a magnetic stirring bar, condenser and a septum, was purged with dry argon and was charged with 10 g (96 mmole) of styrene in 200 g of toluene (5% by weight of solution). The solution was heated to about 60° C. and 1.4M solution of n-butyllithium in hexane was added dropwise until a faint yellow color persisted, then 0.55 ml of additional n-butyllithium in hexane solution was added rapidly. The reaction mixture was maintained at 60° C. throughout the course of the reaction. The progress of the reaction was monitored by gas chromatography. The reaction was essentially completed in 1 hour. The reaction was run an additional 2 hours. The reaction mixture was cooled to 35° C. and then 0.55 grams (a 3 fold molar excess) 5-hexenyldimethylchlorosilane was added to quench the reaction. The polymer solution was reduced in volume and the polymer was precipitated and dried as described for Macromonomer MAC-3b. Gel permeation chromatography revealed a number average molecular weight of 10,200 weight average molecular weight 12,850 and polydispersity of 1.2. The macromonomer was designated MAC-6c. Analysis confirmed that the formula was essentially:

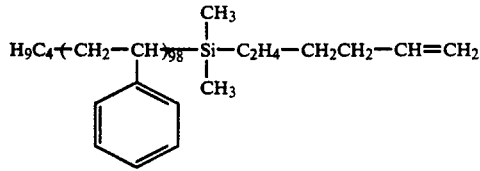

Method Ia, Termination Type B

Polystyrene homopolymeric Z group, coordinate bond linking group

The procedure used to prepare MAC-6c was repeated except that the living polystyryl anion was terminated with 5-hexenyl chloride. The macromonomer obtained had $\overline{M}_n = 10.500$ and a polydispersity of 1.2. It was designated MAC-22. Analysis confirmed that its structure was essentially:

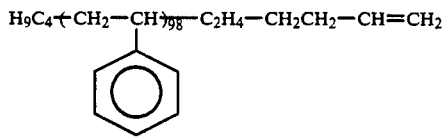

Method Ib, Termination Type D

Polystyrene homopolymeric Z group, and a silyl linking group

The procedure used to prepare MAC-6c was repeated using 4-t-butylstyrene in place of styrene. The macromonomer obtained had $M_n = 13,000$ and a polydispersity of 1.18. It was designated MAC-10. Analysis confirmed that its structure was essentially:

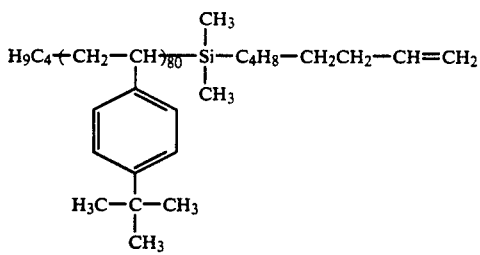

Method II, Butenyl initiating group, alcohol quench

Macromonomer having polystyrene homopolymeric Z group

A 3-butenyl-terminated polystyrene macromonomer having an average molecular weight of about 12,000 was prepared. Styrene (15 g, 144 mmole) was added to 200 g of cyclohexane under anhydrous conditions in the reaction flask producing 7.5 weight percent solution of monomer in the solvent. Approximately 5 to 10 drops of 0.07 molar solution of 3-butenyllithium in hexane were added to the monomer solution to remove impurities and then 19.7 mL of the 3-butenyllithium were rapidly added at 0°-5° C. The temperature of the reaction was slowly raised to 60° C. and maintained at that temperature throughout the course of the reaction. Living polystyryl lithium anion formation was slower with this catalyst than with secbutyllithium. Progress of the reaction was monitored by gas chromatography. The styrene monomer consumption was complete in about 3 hours. The reaction was run for an additional 18 hours. The reaction was quenched with excess methanol. The solution volume was reduced and added as described above to methanol to precipitate the polymer which was collected, dried and designated MAC-20a. Analytical results were as follows: $\overline{M}_n = 11,570$ and $\overline{M}_w = 14,576$ and polydispersity of 1.25. Analysis confirmed that the macromonomer has a structure that was essentially:

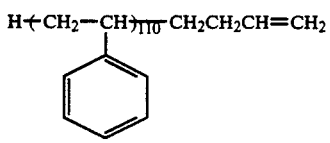

PREPARATION OF GRAFT COPOLYMERS

The data of Examples 1 to 32 is provided in TABLE I, below.

EXAMPLE 1

Five grams of macromonomer-3b (see Table I, below) was dissolved in 20 g of toluene in a dry two-necked flask covered with rubber septa and fitted with an inlet and outlet for an argon purge. One ml of (1.8M) diethylaluminum chloride in toluene was injected by syringe through the septum into the macromonomer solution to form a Lewis acid complex comprised of the macromonomer and the Group III metal portion of the ZN catalyst. In a dry kettle equipped with stirrer and argon purge, 95 grams of the 1-hexene monomer was dissolved 480 g of dry toluene. The macromonomer solution was cannulated under argon to the kettle, and polymerization initiated by adding the ZN catalyst consisting of 1.0 ml of 1.8M diethylaluminum chloride and 0.11 g of AATiCl$_3$ (aluminum activated reduced titanium trichloride, available from Stauffer Chemical Co., Inc., Westport, Conn.) having a Al:Ti mole ratio of 6:1. Polymerization proceeded with a slight exotherm. After 3 hours, the catalyst was deactivated and the graft copolymer was precipitated by the additional 3 liters of methanol. The powdery, precipitated copolymer was washed with methanol to remove spent catalyst and unreacted monomers. The copolymers were stabilized by adding Irganox TM 1010 antioxidant (available from Ciba-Geigy), (3.25% by weight) and dried in a vacuum oven at 60°-70° C. to constant weight. (72 percent conversion).

EXAMPLES 2-5

Using the method of Example 1, the PSA composition shown in TABLE I, designated Ex. 2-5, all of which include a tackifier were prepared. The tackifier was added after preparation of the copolymer to yield the PSA composition.

EXAMPLE 6

The procedure in Example 1 was repeated except that 95 g of 1-octene and 5 g of MAC-3b were used to prepare the copolymer. The copolymer was obtained in 85 percent conversion.

EXAMPLES 7-12

The procedure and components of Example 6 were used except that a tackifier was added to the copolymer.

EXAMPLE 13

A solution containing 95 g of 1-hexene and 5 g of MAC-22 and 100 g of toluene was charged to the reactor (flame dried under argon) fitted with stirrer, argon inlet and outlet, and a condenser. To the solution, the required amount of diethylalumium chloride and AA-TiCl$_3$ was added. The molar ratio of Al to Ti was 2.5 to 1. The copolymerization was allowed to proceed for 6 hours at 25° C. The resulting copolymer was isolated by precipitation in excess methanol (78 percent conversion).

EXAMPLES 14-15

The procedure and components of Example 13 were used except a tackifier was added to the copolymer.

EXAMPLE 16

The procedure in Example 13 was repeated except that 95 g of 1-hexene and 5 g of MAC-6c were used to prepare the copolymer. The copolymer was obtained in 72 percent conversion.

EXAMPLES 17-20

The procedure and components of Example 16 were used except a tackifier was added to the copolymer.

EXAMPLE 21

The procedure in Example 13 was repeated except that 95 g of 1-octene and 5 g of MAC-6c were used to prepare the copolymer. The copolymer was obtained in 56 percent conversion.

EXAMPLES 22-23

The procedure and components of Example 21 were used except a tackifier was added to the copolymer.

EXAMPLE 24

The procedure in Example 13 was repeated except that 85 g of 1-hexene and 15 g of MAC-10 were used to prepare the copolymer. The copolymer was obtained in 65 percent conversion.

EXAMPLE 25

The procedure and components of Example 24 were used except a tackifier was added to the copolymer.

EXAMPLE 26

The procedure in Example 13 was repeated except that 95 g of 1-octene and 5 g of MAC-20a were used to prepare the copolymer. The copolymer was obtained in 66 percent conversion.

EXAMPLES 27-28

The procedure and components of Example 25 were used except a tackifier was added to the copolymer.

EXAMPLE 29

The procedure in Example 13 was repeated except that 95 g of 1-hexene and 5 g of MAC-20a were used to prepare the copolymer. The copolymer was obtained in 56 percent conversion.

EXAMPLE 30–32

The procedure and components of Example 29 were used except that a tackifier was added to the copolymer.

PREPARATION OF PRESSURE-SENSITIVE ADHESIVE TAPES

Pressure-sensitive adhesive compositions were prepared from the macromonomer containing graft copolymers by blending the indicated quantity of tackifying resin with 100 parts by weight graft copolymer. Sufficient toluene was added to form a solution with a viscosity suitable for knife coating (5–15% solids) to produce a coating thickness of 25-μm of dry coating. Each adhesive composition was knife coated onto 38-μm biaxially oriented poly(ethylene-terephthlate) film. The coating was dried for 5 minutes at 150° F. (65° C.) and conditioned for 24 hours at 90% relative humidity and 90° F. (37° C.) to prepare PSA tapes suitable for testing. The tackifiers used in the PSA formulations were:

"Wingtack Plus" a hydrocarbon tackifying resin comprising a synthetic polyterpene having a molecular weight of 1100 and a specific gravity at 25° C. of 0.93.

"Regalrez 1126"

"Arkon P115"

Tape testing was carried out according to the test methods previously described, and the results are shown in TABLE I. It is to be observed in TABLE I that improved R. T. Shear is to be obtained generally with increasing amount of tackifier for each of the differently terminated macromonomer-olefin graft copolymers and that certain tackifiers are more efficient in improving R. T. Shear than others for a given graft copolymer. Ex. 3 shows that, for example, 33% Wingtack Plus in a MAC-3b-hexene copolymer provided a R. T. Shear of 10,000+ while 33% Wingtack Plus in a MAC-3b-octene the R. T. Shear was only 119 (Ex. 7); for a composition having 33% Regalrez 1126 in a MAC-3-octene the R. T. Shear was 8,500+ (Ex. 9). The results show further that without any need for chemical crosslinking, addition of tackifier resin to the macromonomer-olefin copolymer provided pressure sensitive adhesives with peel values of 30 to 80 N/dm and with enhanced shear strength.

TABLE I

| Ex. No. | Macromonomer ($M_n$)(WP %)(p) | Olefin (wt %) | Tackifier (phr) | Peel (N/dm) | R.T. Shear (Min) |
|---|---|---|---|---|---|
| 1* | MAC-3b (10,050)(5)(1.32) | 1-hexene (95) | None | 8 | 25 |
| 2 | MAC-3b (10,050)(5)(1.32) | 1-hexene (95) | Wingtack Plus (18) | 38 | 2,100 |
| 3 | MAC-3b (10,050)(5)(1.32) | 1-hexene (95) | Wingtack Plus (33) | 52 | 10,000+ |
| 4 | MAC-3b (10,050)(5)(1.32) | 1-hexene (95) | Regalrez 1127(33) | 72 | 8,220 |
| 5 | MAC-3b (10,050)(5)(1.32) | 1-hexene (95) | Arkon P115(33) | 67 | 9,800+ |
| 6* | MAC-3b (10,050)(5)(1.32) | 1-octene (95) | None | 16 | 7 |
| 7 | MAC-3b (10,050)(5)(1.32) | 1-octene (95) | Wingtack Plus (33) | 68 | 119 |
| 8 | MAC-3b (10,050)(5)(1.32) | 1-octene (95) | Regalrez 1126(18) | 53 | 159 |
| 9 | MAC-3b (10,050)(5)(1.32) | 1-octene (95) | Regalrez 1126(33) | 80 | 8,500+ |
| 10 | MAC-3b (10,050)(5)(1.32) | 1-octene (95) | Regalrez 1126(54) | 82 sh | 8,500+ |
| 11 | MAC-3b (10,050)(5)(1.32) | 1-octene (95) | Regalrez 1126(100) | 68 sh | 10,000+ |
| 12 | MAC-3b (10,050)(5)(1.32) | 1-octene (95) | Arkon P115(33) | 72 | 1,150 |
| 13* | MAC-22 (10,500)(5)(1.2) | 1-hexene (95) | None | 10 | 35 |
| 14 | MAC-22 (10,500)(5)(1.2) | 1-hexene (95) | Wingtack plus (33) | 58 | 6,500+ |
| 15 | MAC-22 (10,500)(5)(1.2) | 1-hexene (95) | Arkon P115 (33) | 62 | 5,000+ |
| 16* | MAC-6c (10,200)(5)(1.26) | 1-hexene (95) | None | 13 | 18 |
| 17 | MAC-6c (10,200)(5)(1.26) | 1-hexene (95) | Wingtack Plus(33) | 62 | 1,575 |
| 18 | MAC-6c (10,200)(5)(1.26) | 1-hexene (95) | Regalrez 1126(33) | 76 | 8,600+ |
| 19 | MAC-6c (10,200)(5)(1.26) | 1-hexene (95) | Arkon P115(18) | 45 | 5,000+ |
| 20 | MAC-6c (10,200)(5)(1.26) | 1-hexene (95) | Arkon P115(33) | 68 | 3,500+ |
| 21* | MAC-6c (10,200)(5)(1.26) | 1-octene (95) | None | 17 | 105 |
| 22 | MAC-6c (10,200)(5)(1.26) | 1-octene (95) | Regalrez 1126(33) | 75 | 1,549 |
| 23 | MAC-6c (10,200)(5)(1.26) | 1-octene (95) | Arkon P115(33) | 68 | 5,000+ |
| 24* | MAC-10 (13,000)(15)(1.18) | 1-hexene (85) | None | 38 | 56 |
| 25 | MAC-10 (13,000)(15)(1.18) | 1-hexene (85) | Wingtack Plus(33) | 86 | 1,096 |
| 26* | MAC-20a (11,570)(5)(1.25) | 1-octene (95) | None | 18 | 15 |
| 27 | MAC-20a (11,570)(5)(1.25) | 1-octene (95) | Regalrez 1126(18) | 35 | 10,000+ |
| 28 | MAC-20a (11,570)(5)(1.25) | 1-octene (95) | Regalrez 1126(33) | 74 | 13,000+ |
| 29* | MAC-20a (11,570)(5)(1.25) | 1-hexene (95) | None | 11 | 55 |
| 30 | MAC-20a (11,570)(5)(1.25) | 1-hexene (95) | Wingtack plus (33) | 72 | 67 |
| 31 | MAC-20a (11,570)(5)(1.25) | 1-hexene (95) | Regalrez 1126(33) | 74 | 678 |
| 32 | MAC-20a (11,570)(5)(1.25) | 1-hexene (95) | Regalrez 1126(54) | 65 sh | 1,500+ |

* = comparative (free of tackifier)
sh = shocky (doesn't peel smoothly)

Various modifications and alterations of this invention will become apparent to those skilled in the art without departing from the scope and spirit of this invention, and it should be understood that this invention is not to be unduly limited to the illustrative embodiments set forth herein.

I claim:

1. A pressure-sensitive adhesive composition comprising a mixture of:
   a) 40–99% by weight of a ZN graft copolymer comprising
      1) 0.1 to 25% by weight of a macromonomer comprising the polymerized product of at least one of an ethenylarene and a conjugated diene monomer, said product having a terminal ω-alkenyl group of at least 4 carbon atoms and;
      2) 99.9 to 75% by weight of an alpha-olefin having 2 to 18 carbon atoms of which 60 to 100% of the total α-olefins are α-olefins having 6 to 14 carbon atoms; and
   b) 60-1 weight % of one or more tackifying resins.

2. The pressure-sensitive adhesive composition according to claim 1 wherein said graft copolymer contains units having at least one of the formulae:

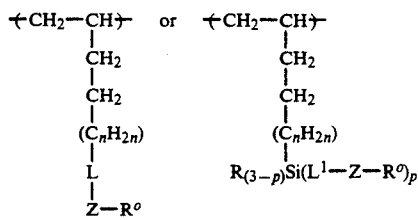

wherein
n is an integer from 2 to 6;
L is a covalent bond or a divalent linking group selected from the group consisting of a carbonyl group,

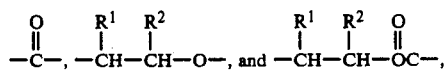

in which each of $R^1$ and $R^2$ is independently hydrogen, an alkyl group having 1 to 4 carbon atoms, phenyl, or both of $R^1$ and $R^2$ together with the carbon atoms to which they are attached form a ring having 5 or 6 carbon atoms;
Z is a divalent polymeric group having either or both ethenylarene and conjugated diene repeat units;
$R^0$ is a saturated or unsaturated linear, branched or cyclic hydrocarbyl group having 2 to 20 carbon atoms; a branched hydrocarbyl group having 3 to 20 carbon atoms or cyclic hydrocarbyl group having 5 to 20 carbon atoms;
R is independently a monovalent hydrocarbyl group which is selected from alkyl groups having from 1 to 18 carbon atoms, aryl groups having from 6 to 10 carbon atoms, and cyclic hydrocarbyl groups having from 5 to 10 carbon atoms;
$L^1$ is a covalent bond or a divalent linking group

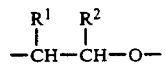

in which $R^1$ and $R^2$ are defined above;
p is the integer 1, 2, or 3.

3. The pressure-sensitive adhesive composition according to claim 2 wherein said graft copolymer contains units having the formula:

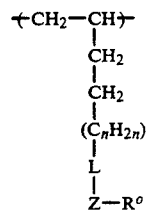

wherein
n, L, Z, and $R^0$ are as previously defined.

4. The pressure-sensitive adhesive composition according to claim 2 wherein said graft copolymer contains units having the formula:

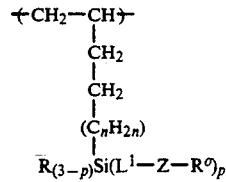

wherein R, $L^1$, Z, $R^0$, p and n are as previously defined.

5. The pressure-sensitive adhesive compositions according to claim 2 wherein the divalent polymeric group Z of said graft polymer has the general formula:

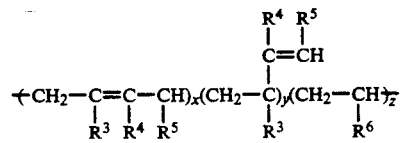

wherein:
each of $R^3$, $R^4$, and $R^5$ is independently hydrogen, a phenyl group, an alkyl group having 1 to 12 carbon atoms, and alkenyl group having 2 to 12 carbon atoms, or any two of $R^3$, $R^4$, and $R^5$ together with the carbon atoms to which they are attached form one or two saturated or unsaturated 5 or 6 carbon atom-containing rings;
$R^6$ is an aryl group having 6 to 18 carbon atoms, optionally substituted by lower alkyl groups having from 1 to 4 carbon atoms, trialkylsilyl, 2,2-dialkyl alkoxysilyl, N,N-bis(trimethylsilyl)amino, and trimethylsiloxyethyl groups; and 1,1-dimethylethoxycarbonyl; and
x, y, and z are numbers providing a number average molecular weight of 2,000 to 30,000 to the polymeric Z group and expressing the number of ethenylarene and conjugated diene groups that are present in random or block configurations in the polymeric Z group, in which numbers any of x, y and z can be zero, but at least one of x, y and z is not zero.

6. The pressure-sensitive adhesive composition of claim 1 wherein said graft copolymer is selected from graft copolymers having the following formulae:

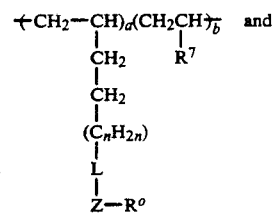

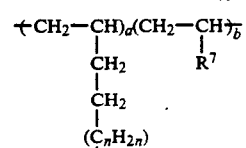

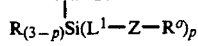

wherein
L, $L^1$, Z, $R^0$, R, p and n are defined above;

R[7] is hydrogen or one or more alkyl groups having 1 to 16 carbon atoms, at least 60% of R[7] being alkyl groups having 4 to 12 carbon atoms; and a and b are numbers expressing the number of macromonomer units and α-olefin units randomly located in the graft polymer chain and providing a number average molecular weight of 50,000 to 10,000,000 to the graft polymer, and a having a value that is 0.1 to 25% of (a+b).

7. The pressure-sensitive adhesive composition according to claim 1 wherein said graft copolymer is phase-separated into rubbery regions and glassy regions.

8. The pressure-sensitive adhesive composition according to claim 7 wherein the rubbery phase separated regions having a glass transition temperature of from −70° C. to −10° C.

9. The pressure-sensitive adhesive composition according to claim 7 wherein the glassy phase separated regions have a glass transition temperature of from 20° C. to 300° C.

10. The pressure-sensitive adhesive composition according to claim 1 having a shear strength of from 30 to 10,000 minutes at 25° C.

11. The pressure-sensitive adhesive composition according to claim 1 wherein the macromolecular monomer has a number average molecular weight of from 2,000 to 30,000.

12. The pressure-sensitive adhesive composition according to claim 1 wherein said graft copolymer has a number average molecular weight of from 50,000 to 10 million.

13. The pressure-sensitive adhesive composition according to claim 1 wherein said macromolecular monomer has polydisperity of from 1.05 to 5.0.

14. The pressure-sensitive adhesive composition according to claim 1 wherein said pressure-sensitive adhesive is heat activated.

15. The pressure-sensitive adhesive composition according to claim 1 wherein said pressure-sensitive adhesive is hot-tackifying.

16. The pressure-sensitive adhesive compositions according to claim 1 wherein said ethenylarene monomer is styrene.

17. The pressure sensitive composition according to claim 1 comprising 1) a ZN graft copolymer comprising a macromonomer having the formula

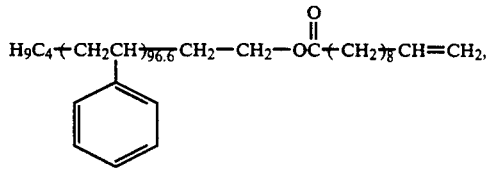

2) 1-hexene as comonomer, and an effective amount of a hydrocarbon tackifying resin based on a $C_5$ olefin.

* * * * *

UNITED STATES PATENT AND TRADEMARK OFFICE
CERTIFICATE OF CORRECTION

PATENT NO. : 5,294,668
DATED : March 15, 1994
INVENTOR(S) : Gaddam N. Babu

It is certified that error appears in the above-indentified patent and that said Letters Patent is hereby corrected as shown below:

Col. 8, Summary
Reaction III, line 40 "... $H_{2n}$--Li$^-$ + ..." should read -- $H_{2n}$--Li$^+$ + ... --

Col. 9, line 44      "1-ethenyl-4-t-butylbenzene," should read

-- 1-ethenyl-4-<u>t</u>-butylbenzene, --

Col. 9, line 47      "1-ethenyl-4 [1,1-dimethyl)ethoxycar-" should read

-- 1-ethenyl-4[1,1-dimethyl)ethoxycar- --

Col. 14, line 24      "six ultra" should read -- six (6) ultra --

Signed and Sealed this

Fourth Day of October, 1994

Attest:

BRUCE LEHMAN

*Attesting Officer*              *Commissioner of Patents and Trademarks*